United States Patent [19]

Moore

[11] Patent Number: 5,613,465
[45] Date of Patent: Mar. 25, 1997

[54] CONTROLLED RELEASE AQUATIC NUTRIENTS

[75] Inventor: William P. Moore, Hopewell, Va.

[73] Assignee: The Vigoro Corporation, Chicago, Ill.

[21] Appl. No.: 378,589

[22] Filed: Jan. 27, 1995

[51] Int. Cl.$^6$ .................................................. A01K 61/02
[52] U.S. Cl. ............................................................. 119/230
[58] Field of Search .................................. 119/230, 242, 119/268, 212

[56] References Cited

U.S. PATENT DOCUMENTS

| | | | |
|---|---|---|---|
| 4,400,399 | 8/1983 | Müller | 119/230 |
| 4,708,090 | 11/1987 | Molaug et al. | 119/230 |
| 5,128,153 | 7/1992 | Axelrod | 119/230 |

Primary Examiner—Thomas Price

[57] ABSTRACT

A method of using phosphate chemicals of the formula $LDPO_4$ to provide controlled release nutrients to the food chain in aquatic environments to supply improved feeding and growth of fish, wherein L represents a monovalent Lewis Acid moiety, D represents a divalent metal moiety, and $PO_4$ represents an orthophosphate moiety. The method includes the use of slow release phosphate chemicals which provide water soluble nutrients disseminating in flowing water streams for a period of about one year. The chemicals include: magnesium ammonium phosphate, manganous ammonium phosphate, zinc ammonium phosphate, ferrous ammonium phosphate, magnesium potassium phosphate, manganous potassium phosphate, and manganous potassium phosphate.

13 Claims, No Drawings

CONTROLLED RELEASE AQUATIC NUTRIENTS

BACKGROUND OF THE INVENTION

1. Field of the Invention

This invention relates to aquatic life nutrients, and, more particularly, to the use as an aquatic nutrient of the phosphate compound $LDPO_4$, wherein L represents a Lewis Acid moiety, and D represents a divalent metal moiety. It relates still more particularly to the use of this composition to support the food chain in water by supplying primary nutrients, secondary nutrients, and micronutrients to microbes, algae, fungi, and aquatic plants. These members, low in the food chain, are essential to the feeding of lower animal life forms, which, in turn, supply food for fish. Effective feeding of the lower members in the food chain is particularly important to the survival and growth of newly hatched and juvenile fish in flowing streams, estuaries, and lakes.

2. Description of the Prior Art

Although many streams contain excess nutrients and grow too much microbial material, algae and aquatic plants, many streams do not contain enough nutrients to support a food chain ranging from microbes and algae, to insect larvae, to fish, for example. These nutrient shortages usually occur in remote glacial streams and lakes in the cooler parts of the earth and are exascerbated by operations which remove the plant life from surrounding areas. For example, removal of timber can cause loss of the flow of nutrients from the area's soil, and, in turn, cause the nutrient concentrations in streams to decrease to a point where the survival rate of newly hatched and juvenile fish in the streams is severely decreased because of low food availability.

Slaney and Northcote in 1974 showed that food availability directly affects the abundance, growth rate, and the production of juvenile fish per unit of stream area. Increases in levels of inorganic nutrients in streams were shown by Johnston et al in 1990 to increase production of the lower members of the food chain thereby increasing insect abundance, which, in turn, increased the growth of fish.

The foregoing and other workers in the field have demonstrated the need and benefits of supplying nutrients to nutrient deprived streams to support fish, particularly in the early part of the fish life cycle. Ordinary fertilizers such as liquid or granular ammonium phosphates have been used with at least scientific, if not practical, success, by controlling addition rates to streams with drip or auger feeding systems. These soluble nutrients are dissolved, diluted, and soon carried away from the desired use areas by the water.

Ureaformaldehyde polymer nutrients have been tried but were found to release too quickly for effectiveness in water. Another problem with the ureaformaldehyde granules is their low density which allows the granules to be washed to undesired locations. This low density was also found to be a problem with polymer coated nutrient granules. Sulfur coated granules lost integrity and released their soluble nutrients too quickly.

This writer and others in the prior art have developed magnesium ammonium phosphate, and similar phosphate compounds, as controlled release terrestrial fertilizers. These fertilizers released their contained nutrients in and on the soil at about the same rate as ureaformaldehyde fertilizers and the granules behaved physically in a similar manner.

The prior art has not found a granular nutrient which may be used to substantially remain where it is applied in a flowing aquatic environment and supply nutrients in a controlled manner to the food chain providing food for fish.

OBJECTS OF THE INVENTION

A primary object of this invention is to provide a new and improved method of supplying nutrients to support the food chain in aquatic environments.

A further object is to provide an improved method of supplying nutrients in a controlled manner to the food chain in flowing streams as particles which remain at the point of their application.

A further object of this invention is to provide a method of improving the survival and growth rates of juvenile fish by supplying controlled release granular nutrients to their aquatic environment.

SUMMARY OF THE INVENTION

The present invention is directed to a new method of improving the growth of fish by a surprising new use of heavy particulate phosphate compounds which exhibit very low nutrient release rates. The new method uses phosphate chemicals of formula $LDPO_4$ to supply controlled release nutrients to the food chain in aquatic environments to provide improved feeding and growth of fish. In the formula, L represents a monovalent Lewis Acid moiety, D represents a divalent metal moiety, and $PO_4$ represents an orthophosphate moiety.

It was discovered that when a nutritiously effective amount of these compounds was placed in substantial contact with moving water, the compounds remained in place and allowed water to disseminate the soluble nutrients slowly released by the phosphate compounds, thereby effectively feeding the lower members of the food chain which provided an increased supply of food for fish and improved their growth rate in the aquatic environment.

DETAILED DESCRIPTION OF THE INVENTION

This invention provides a new method of efficacious use of phosphate chemicals of the formula $LDPO_4$ to supply controlled release nutrients to the food chain which grows at an increased rate in aqueous environments and supplies feed for improved growth of fish therein. In the phosphate chemical formula, L represents a monovalent Lewis Acid moiety, D represents a divalent metal moiety, and $PO_4$ represents an orthophosphate moiety.

For effective use in feeding of the aquatic food chain, it was necessary that each of the components, L, D, and $PO_4$, be present in the phosphate chemical selected, and it was also necessary that the particulate phosphate compound be substantially water insoluble. Substantially water insoluble, herein, means that more than one-half of the total nutrients are cold water insoluble, as determined according to AOAC Method 945.01 in Official Methods of Analysis 15th Edition, published by the Association of Official Analytical Chemists, Inc.

Effective use requires placing a nutritiously effective amount of the selected phosphate compound in substantial contact with flowing water in the aquatic environment so that the water can slowly hydrolyze the particulate $LDPO_4$. The nutritiously effective amount of the present formula varies depending upon the degree of nutrient deprivation in the aquatic environment. If the deprivation is severe, a small amount of the instant phosphate is effective in increasing growth of the aquatic food chain, and in improving the growth of the fish in the environment. The growth of fish was found to be improved in several ways including faster growth rates of individual juvenile fish, the survival and growth of a larger percent of hatched fish, and the production of more fish per unit of aquatic environment area.

For effective use, the granules must be substantially in contact with flowing water. Substantially in contact with means that more than one-half of the surface of the granules must be in contact with the flowing water. The velocity of the water is relatively unimportant but it must be sufficient to provide the water to hydrolyze the slow release phosphate chemical compound.

To effectively feed members of the food chain and thereby supply food for fish, and provide for their growth in an aquatic environment, the water must be allowed to be in contact with the selected phosphate compounds for a period of time amounting to between 30 and 365 days to disseminate water soluble nutrients slowly released.

Aquatic food chains which culminate to provide food for fish are life forms which range from very simple life forms such as microbes through algae, fungi, and aquatic plants, to such life forms as larvae, worms, and insects on which fish feed.

These food chains exist in almost all aquatic environments although the numbers and orders in the food chain may change somewhat if the environment is a river, creek, lake, estuary, pond, pool, or aquarium. The food chains also vary depending upon the degree of nutrient deprivation in the individual environment.

The composition of formula $LDPO_4$ may be used to supply the nutrients most needed in an aquatic environment. It was found that the nutrients ammonium, potassium, and sodium could be effectively supplied when they were combined in the $LDPO_4$ compound as L, the monovalent Lewis Acid moiety.

It was also found in the instant use, magnesium, zinc, ferrous, manganous, and cupric nutrients were effective in the $LDPO_4$ compound as D, the divalent metal moiety.

The use was particularly effective when the phosphate compound chosen was one of the following phosphate compounds: magnesium ammonium phosphate, magnesium potassium phosphate, manganous ammonium phosphate, manganous potassium phosphate, zinc ammonium phosphate, zinc potassium phosphate, ferrous ammonium phosphate, and ferrous potassium phosphate.

The high density of the particulate phosphate compounds is one of the reasons that the method of use for feeding aquatic food chains in flowing streams is effective. The particles remain essentially where they are inserted into the water until they release their contents as water soluble nutrients. Most effective use is found when the bulk density of the phosphate compounds is between 0.8 and 2.0 grams per milliliter.

The physical use form of the instant phosphate compounds may be changed as required to assure that the slow release particles do not move even in rapidly flowing water. Physical forms found to hold their place well when $LDPO_4$ is used to supply nutrients in flowing streams are: granules, extrusions, briquettes, compacted pieces, and flakes. When very high flow rates are encountered, the particulate phosphates of this invention may be used in containers which reduce water access, and in matrices containing other heavy water insoluble materials.

The use of phosphates of formula $LDPO_4$ for aquatic nutrients is only effective when the nutrients are substantially water insoluble, with best usage found when each of the moieties in the formula originally have percent cold water insolubilities between 70 and 99 plus percent.

The instant use requires that some flow of water be present to disseminate the solubilized nutrients. Diffusion into slight movements of water is usually sufficient.

High velocity water does not negate the effectiveness of the instant use to feed the food chains in aquatic systems, but it does reduce the efficiency of recovery of the solubulized nutrients by the food chains because the nutrients are so rapidly removed from the desired aquatic environment. Most effective use is found when the particulate phosphate compound is placed in an aquatic environment where it is in substantial contact with water flowing at rates between 0 and 1.5 meters per second.

The preferred use of the instant invention provides for placing the particulate phosphate compound in a desirable form in an aquatic environment in contact with flowing water so that the release of the nutrients contained in the compound is substantially complete in one year. In this use, nutrients may be applied to a stream once per year without fear of: killing the fish, overfeeding the food chain, sending the nutrients to an undesired location, or wasting nutrients.

The use of the particulate phosphate compounds may be applied by aerial drop, spreading from boats, or hand application as free particles or as container held particles. The method of use selected depends upon location and type of aqueous environment treated.

The method of using the instant particulate phosphate compounds is especially effective for improving the growth of juvenile fish in nutritionally deprived water streams. Such streams are found when the streams are derived from glacial waters, or waters from land where most of the plant life has been removed by tree cutting, or industrial activities.

In these uses the growth of juvenile fish is improved in nutritionally deprived water streams by placing in the streams a phosphate compound of a formula $LDPO_4$ to provide controlled release nutrients to a food chain consisting of one or more of the life forms microbes, algae, fungi, aquatic plants, larvae, worms, and insects, which culminates as feed for fish.

In this preferred use method, a granular phosphate compound is selected which has the formula $LDPO_4$ where L represents a monovalent Lewis Acid moiety, and D represents a divalent metal moiety. The formula contains nutrients needed by the nutrient deprived water stream.

A nutritiously effective amount of the granular phosphate compound which has a bulk density between 0.9 and 1.8 grams per milliliter is placed in the nutritionally deprived water stream so that it is in substantial contact with water flowing at a rate between 0.1 and 0.4 meters per second.

After the granular compound is placed, it is best to allow the flowing water to disseminate water soluble nutrients slowly released by the granular phosphate compound into the water for a period of time between 80 and 365 days. This slow and continuing relase of nutrients increases the growth of the aquatic food chain which in-turn supplies the food necessary to improve the growth of juvenile fish in the nutritionally deprived water streams.

In the preferred use, the granular phosphate chemical compounds found effective include: magnesium ammonium phosphate, magnesium potassium phosphate, manganous ammonium phosphate, manganous potassium phosphate, zinc ammonium phosphate, zinc potassium phosphate, ferrous ammonium phosphate and ferrous potassium phosphate.

MODE OF OPERATION OF THE INVENTION

Having described the basic concepts of the instant invention, reference is now made to the following examples which are provided to illustrate the inventions method of use of particulate controlled releasing phosphate chemicals of formula $LDPO_4$ to supply nutrients to support the food chain in aquatic environments and thereby improve the growth of fish therein.

EXAMPLE 1

This example demonstrates the use of $LDPO_4$ to feed the food chain and improve the growth of fish in a nutritionally deprived water stream, compared to other terrestrial fertilizers.

Briquettes each weighing about 15 grams were formed of the formula $LDPO_4$ compound magnesium ammonium phosphate and a small amount of lignin added. Analysis of the briquettes was 8-40-0-12(Mg). Bulk density of the briquettes was 1.2 grams per milliliter.

These briquettes were placed in a series of wire baskets each containing about 150 grams in good contact with water flowing in a nutritionally deprived glacially derived stream flowing to the Pacific Ocean in North America. Water was passed over the bskets at rates controlled by pumps at velocities of about 0.1 meter per second and about 0.2 meters per second at temperatures varying from about 5° to 14° C. for 100 days.

Also placed in other series of baskets in the two water streams were 150 grams of tablets of 20-10-5, and 150 grams of alkyd resin coated diammonium phosphate, analyzing 14-36-0. The baskets of nutrients were weighed several times during the 100 day test period to measure the dissolution or loss of the nutrients with time. The results are shown as follows:

| | Average Dry Weights, gms/basket | | | | |
|---|---|---|---|---|---|
| Test Material | Original | After 10 days | After 40 days | After 60 days | After 100 days |
| 8-40-0-12(Mg) | 150 | 161 | 148 | 135 | 125 |
| 20-10-5 | 150 | 0 | — | — | — |
| 14-36-0 | 150 | 0 | — | — | — |

The 20-10-5 tablets dissolved, and the coated 14-36-0 granules floated and dissolved out of the open wire baskets. The $LDPO_4$ briquettes remained in the open wire baskets and after an initial absorption of water was steadily releasing nutrients to feed the food chain in the nutrient deprived water environment.

EXAMPLE 2

This example demonstrates the practicality of the new use method for $LDPO_4$ phosphate compounds in providing nutrients to an aquatic environment for improving growth of fish.

Granular 8-40-12, magnesium ammonium phosphate, was applied to a nutritionally deprived glacially derived creek and a tributary to a river which flows into the Pacific Ocean in North America. Application at the rate of about 100 kilograms per hectare was made by mechanical spreader operating from a helicopter hovering above the creek in the spring of 1993.

Prior to application, the food chain represented by bacteria, algae, aquatic plants, worms, and insects was present in amounts to support growth of only a few juvenile salmon.

Inspection of the creek in the late spring of 1994 showed that it was unchanged above the point of application of the $LDPO_4$. At and below the point of application there was a marked change in the aquatic environment and a small amount of the magnesium ammonium phosphate applied in 1993 remained still in particulate form in the aqueous environment. Algae, worms, bugs, and insects were found in abundance on and under stones in the creek and on the bottom and edges of the creek. The size and abundance of juvenile salmon at and below the point of application in 1994 was about double that before treatment in 1993.

Similar mechanical broadcast applications with other coated and tabletted terrestrial fertilizers caused mechanical destruction of the fertilizers so that they were ineffective.

EXAMPLE 3

This example demonstrates the effective use of particulate compounds of formula $LDPO_4$ in comparison with other terrestrial fertilizers under conditions of water diffusion of solubulized nutrients in aqueous environments with varying water temperature.

In two 100 liter aquariums, with water temperatures controlled at 10° and 20° C., respectively, six briquettes of potassium magnesium phosphate weighing 15 grams and analyzing 0-37-24-12(Mg) were placed in contact with water on the bottom of the aquariums. Also placed in similar locations in the aquariums were samples of plastic coated potassium nitrate, and briquettes of mixed potassium phosphate and magnesium phosphates analyzing 0-26-17-8.4(Mg).

There were small thermal currents set up in the aquariums by incidental temperature changes and diffusion of nutrients throughout the water occurred as the nutrients were solubulized.

No fish or members of a food chain were present, but the remaining unreleased nutrients were measured from time to time throughout a 300 day test period and the results are shown as follows:

| | | Remaining Total Nutrients, Wt Percent | | | | |
|---|---|---|---|---|---|---|
| Test Material | Temp °C. | 25 days | 50 days | 100 days | 200 days | 300 days |
| 0-37-24-12(Mg) | 10 | 97 | 85 | 71 | 49 | 31 |
| | 20 | 97 | 82 | 67 | 44 | 26 |
| Coated $KNO_3$ | 10 | 12 | 4 | — | — | — |
| | 20 | 7 | 2 | — | — | — |
| Mixed 0-26-17-8.4(Mg) | 10 | 0 | — | — | — | — |
| | 20 | 0 | — | — | — | — |

I claim:

1. A method of using phosphate chemicals of formula $LDPO_4$ to provide controlled release nutrients to a food chain which grows in an aquatic environment and thereby supplies feed for the growth of fish therein, the method comprising:

(a) selecting a substantially water insoluble particulate phosphate compound of formula $LDPO_4$, wherein L represents a monovalent Lewis Acid moiety and D represents a divalent metal moiety, for use as a source of controlled release aquatic nutrients;

(b) placing a nutritiously effective amount of the selected phosphate compound in the aquatic environment in substantial contact with water; and, (c) allowing the water to remain in contact with the selected phosphate compound for a period of time amounting to between 30 and 365 days to disseminate water soluble nutrients slowly released therefrom, effectively feeding members of the food chain and thereby supplying food for fish in the aquatic environment.

2. The method of claim 1 wherein the food chain comprises one or more life forms which supply feed for fish, the life forms being selected from the group consisting of microbes, algae, fungi, aquatic plants, larvae, worms, and insects.

3. The method of claim 1 wherein the aquatic environment is an aqueous body selected from the group consisting of rivers, creeks, lakes, estuaries, ponds, pools, and aquariums.

4. The method of claim 1 wherein, in the formula $LDPO_4$, L represents a monovalent moiety selected from the group consisting of ammonium, potassium, and sodium.

5. The method of claim 1 wherein D represents a divalent metal moiety selected from the group consisting of magnesium, zinc, manganous, ferrous, and cuptic.

6. The method of claim 1 wherein the phosphate compound is selected from the group of compounds consisting of magnesium ammonium phosphate, magnesium potassium phosphate, manganous ammonium phosphate, manganous potassium phosphate, zinc ammonium phosphate, zinc potassium phosphate, ferrous ammonium phosphate, and ferrous potassium phosphate.

7. The method of claim 1 wherein the particulate phosphate compound exhibits a bulk density between 0.8 and 2.0 grams per milliliter.

8. The method of claim 1 wherein the particulate phosphate compound is in a physical form selected from the group consisting of granules, extrusions, briquettes, compacted pieces, flakes, containers which reduce water access, and matrices.

9. The method of claim 1 wherein each of the L, D, and $PO_4$ moieties as combined in $LDPO_4$ exhibit between 70 and more than 99 percent cold water insolubility.

10. The method of claim 1 wherein the particulate phosphate compound is placed in the aquatic environment where it is in substantial contact with water flowing at rates of about 0 to 1.5 meters per second.

11. The method of claim 1 wherein the particulate phosphate compound is placed in the aquatic environment in contact with flowing water so that release of compound nutrients is substantially complete in one year.

12. A method of improving growth of juvenile fish in nutritionally deprived water streams by placing therein a phosphate chemical compound of a formula $LDPO_4$ to provide controlled release nutrients to a food chain consisting of microbes, algae, fungi, aquatic plants, larvae, worms, and insects which culminates as feed for fish, the method comprising:

(a) selecting a granular phosphate compound, exhibiting a formula of $LDPO_4$, wherein L represents a monovalent Lewis Acid moiety and D represents a divalent metal moiety, which contains nutrients needed by the nutrient deprived water stream;

(b) placing a nutritiously effective amount of the granular phosphate compound exhibiting a bulk density between 0.9 and 1.8 grams per milliliter in the water stream so that it is in substantial contact with water flowing at a rate between 0.1 and 0.4 meters per second;

(c) allowing the flowing water to disseminate water soluble nutrients slowly released by the granular phosphate compound into the water for a period of time between 80 and 365 days, thereby increasing growth of a food chain which supplies food necessary to improve the growth of juvenile fish.

13. The method of claim 11, wherein the granular phosphate chemical compound is selected from the group consisting of magnesium ammonium phosphate, magnesium potassium phosphate, manganous ammonium phosphate, manganous potassium phosphate, zinc ammonium phosphate, zinc potassium phosphate, ferrous ammonium phosphate, and ferrous potassium phosphate.

* * * * *